(12) United States Patent
Gabriel et al.

(10) Patent No.: US 7,798,171 B2
(45) Date of Patent: Sep. 21, 2010

(54) VALVE ASSEMBLY

(75) Inventors: George S. Gabriel, Seaford, DE (US);
Neil E. Campbell, Eden, MD (US); Dale Murray, Elkton, MD (US); Rodney Gerringer, Forest Hill, MD (US); Edward K. Eldreth, Port Deposit, MD (US)

(73) Assignee: Lab Products, Inc., Seaford, DE (US)

( * ) Notice: Subject to any disclaimer, the term of this patent is extended or adjusted under 35 U.S.C. 154(b) by 228 days.

(21) Appl. No.: 11/580,730

(22) Filed: Oct. 13, 2006

(65) Prior Publication Data

US 2008/0087229 A1    Apr. 17, 2008

(51) Int. Cl.
*F16L 37/32* (2006.01)
(52) U.S. Cl. .............................. 137/614.04; 137/614.05; 251/149.6
(58) Field of Classification Search ............ 137/614.04, 137/614.05, 614.2; 215/149.1, 149.6; 119/417–419
See application file for complete search history.

(56) References Cited

U.S. PATENT DOCUMENTS

| | | | | |
|---|---|---|---|---|
| 2,735,696 | A * | 2/1956 | Omon et al. ............ | 137/614.05 |
| 3,918,492 | A * | 11/1975 | Karcher et al. .......... | 137/614.04 |
| 4,200,121 | A * | 4/1980 | Walter et al. ............ | 137/614.05 |
| 4,343,261 | A | 8/1982 | Thomas | |
| 4,365,590 | A | 12/1982 | Ruggieri et al. | |
| 4,798,223 | A | 1/1989 | Mitchell et al. | |
| 4,858,648 | A * | 8/1989 | Smith et al. ............ | 137/614.04 |
| 4,949,745 | A * | 8/1990 | McKeon ................. | 137/614.03 |
| 5,261,638 | A * | 11/1993 | Onishi et al. ........... | 137/614.04 |
| 5,337,696 | A * | 8/1994 | Edstrom et al. ......... | 119/456 |
| 5,349,923 | A | 9/1994 | Sheaffer et al. | |
| 5,385,118 | A * | 1/1995 | Coiro et al. ............. | 119/418 |
| 5,709,244 | A * | 1/1998 | Patriquin et al. ....... | 137/614.04 |
| 5,806,564 | A * | 9/1998 | Wilcox .................. | 137/614.05 |
| 6,237,631 | B1 * | 5/2001 | Giesler et al. .......... | 137/614.04 |
| 6,308,660 | B1 | 10/2001 | Coiro, Sr. et al. | |
| 6,382,589 | B1 * | 5/2002 | Edstrom et al. ......... | 251/149.6 |

OTHER PUBLICATIONS

Communication Relating to the Results of the Partial International Search from the International Searching Authority (EP) for International Application No. PCT/US2007/080711 dated Jun. 26, 2008.
International Search Report and Written Opinion of the International Searching Authority (US) for International Application No. PCT/US2007/080713 dated Aug. 25, 2008.

* cited by examiner

*Primary Examiner*—John Rivell
*Assistant Examiner*—Craig Price
(74) *Attorney, Agent, or Firm*—Stroock & Stroock & Lavan LLP

(57) ABSTRACT

The present invention relates to a valve having a first assembly cooperating with a second assembly to create a seal, wherein the first assembly opens before the second assembly opens and closes after the second assembly closes. The invention also relates to a valve wherein the pressure required to open the second assembly is greater than the pressure required to open the first assembly.

8 Claims, 16 Drawing Sheets

VALVE ASSEMBLY

BACKGROUND OF THE INVENTION

1. Field of the Invention

The present invention relates to a laboratory cage and rack system. More specifically, the invention relates to a ventilated rack system, which can substantially eliminate the transfer of contaminants or pathogens between a cage system housed in a rack and the laboratory room in which the rack is located.

2. Description of Related Art

Recently, there has been an increased need for biocontainment, so that high BSL (bio safety level) experiments can be conducted with a minimal risk to the laboratory personnel. Whereas the currently available cage and rack systems maximize the safety of the laboratory animals, there tends to be less focus on protecting the laboratory personnel that handles the cages and the animals from the contaminants and pathogens that may be present in the cages.

There are certain biocontainment cage and rack systems available in the market directed to biocontainment to provide containment of the contaminants and pathogens in the cage. For example, the ISOCAGE™ of Tecniplast, S.p.a., a description of which is provided at http://www.tecniplastusa.com/italframeCP5.html, and IVC Rodent Caging Systems of Allentown Caging Equipment Company provide systems wherein the cage is sealed and air is introduced and removed through valves. In these systems, generally, the rack contains an air supply system for supplying HEPA filtered air into the cages and an air exhaust system for removing air from the cage, thus maintaining a constant airflow of HEPA filtered air within the cage. The cage is kept sealed using a soft seal, such as a silicon seal, which is positioned between the cage top and cage bottom. The rack is an open rack having air plenums for supplying and removing air to and from the sealed cages.

These biocontainment systems may, however, have several drawbacks. For example, the soft seal is removable, either inadvertently or purposefully for cleaning and autoclaving, and can either be improperly positioned when replaced or become shifted from its proper position during use. When any interruption in the seal occurs, either unfiltered ambient air may enter the cage, thus placing the encaged animal at risk, or the unfiltered air from the cage may enter the laboratory room, thus putting the laboratory personnel at risk.

Additionally, because the cages of these currently available biocontainment systems are sealed, if the air supply is removed or stopped, there would be no new air being introduced into the cage. For example, if there is an extended power outage, if the airflow is obstructed, or if supply port becomes blocked, etc., the animal can be deprived of new or recirculated air for an extended period of time. This has the potential to impair the health of the animals. Additionally it does not require serious injury to impair or ruin the experimental reason for housing the laboratory animals. Accordingly, an extended deprivation of air supply in the cage can delay the experiment and hence cause a substantial financial loss for the laboratory.

Accordingly, there is a need to provide a cage and rack system can provide a safe and comfortable environment for laboratory animals as well as the laboratory personnel handling the cage and animals, more particularly, for use in higher level BSL experiments.

SUMMARY OF THE INVENTION

The present invention relates to a ventilated containment system having an air circulation system that substantially prevents air from within the containment system from seeping out into the atmosphere, such as a laboratory room. A first level of containment can be provided by the cage exhaust system preventing the air from within the cage from entering the rack, and a second level can be provided by the air circulation system preventing air from the rack from entering the laboratory room. This first level of containment may also prevent cross contamination between cages and substantially prevents the escape of the contaminants from the cage into the rack, thus rendering the atmosphere, such as a laboratory room, safer for the laboratory personnel in the laboratory room.

The containment system preferably houses one or more containers, and substantially prevents air from within the containers from exiting the container into the containment system and further from entering the laboratory room.

The invention also relates to a cage and rack system for housing a plurality of cages suitable for housing animals, wherein the air circulation system provides HEPA filtered air into the rack. The containment system preferably includes a cage exhaust system for drawing air from the rack into the cage and removing air from the cage, thus providing HEPA filtered air into the cage and preventing the contaminated air from within the cage from entering the rack.

The invention further relates to a cage assembly having a filter top through which air can enter and exit the cage via natural air exchange, the cage further including an exhaust valve for connecting to an exhaust system. By providing a filter top, the cage can become a static cage permitting natural air exchange between the cage and the atmosphere, whether that be within the rack or on a laboratory table, etc., when the cage is removed from the exhaust system or if the exhaust system ceases to work. The cage also can cooperate with an exhaust system for drawing air out of the cage. The cage preferably includes a filtered valve, for example, a valve covered by a filter, wherein the negative pressure created from the exhaust system is sufficient to effectively draw in air from within the rack into the cage. The valve is preferably located proximate the bottom of the cage, to ensure effective circulation of the air within the cage and to maximize the amount of waste such as ammonia being removed from the cage.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description taken in connection with the accompanying drawings, in which.

DESCRIPTION OF EXEMPLARY EMBODIMENTS

Certain exemplary embodiments of the present invention will now be described with reference to the drawings. In general, such embodiments relate to a ventilated containment system and a cage and rack system wherein the air from within the system, or whatever is being housed within the system, is substantially prevented from entering the surrounding atmosphere. Certain embodiments of the invention relate to a cage wherein the air from within the cage is substantially prevented from entering the surrounding atmosphere, such as a rack wherein the cage is housed.

Figure 1:
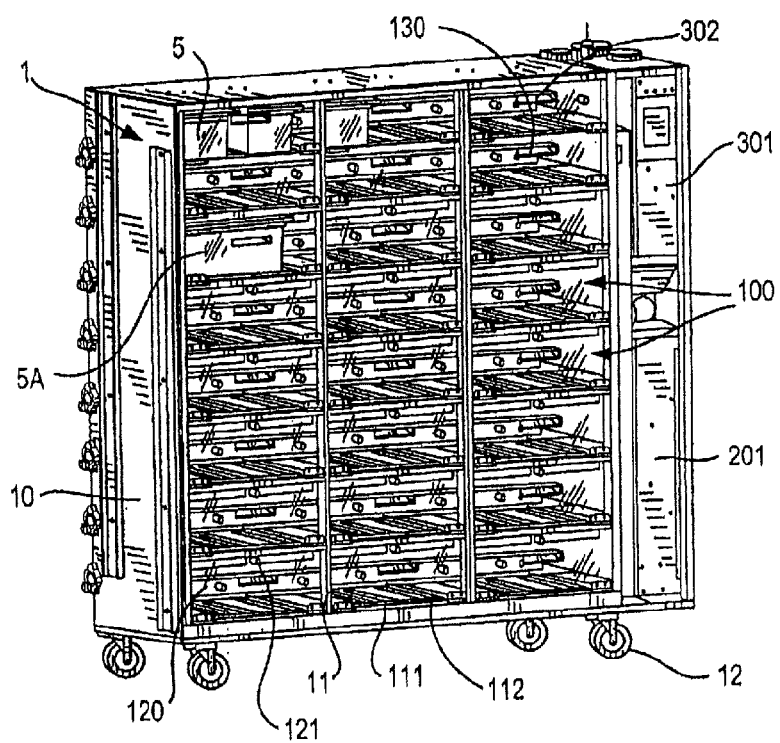
FIG. 1 is a perspective view of a cage and rack system in accordance with an embodiment of the invention.
Figure 2:
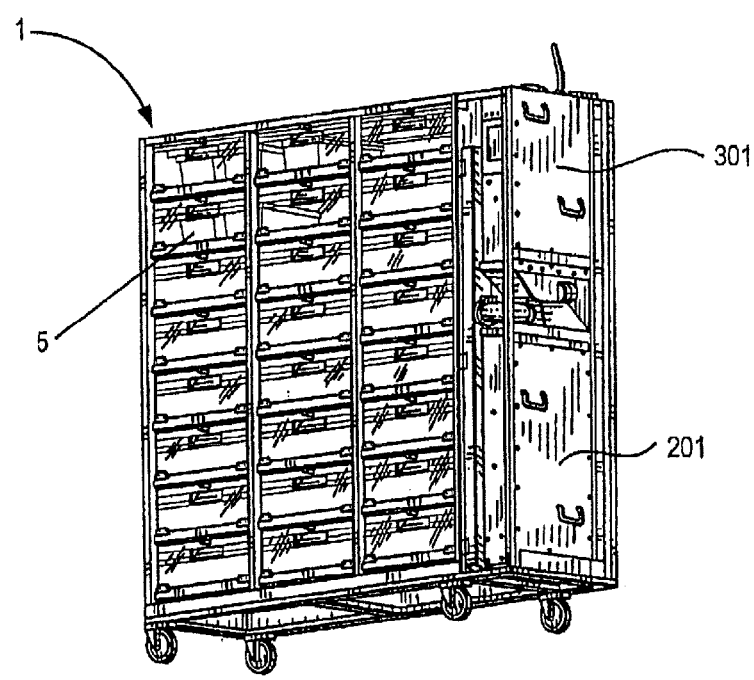
FIG. 2 is another perspective view of a cage and rack system in accordance with an embodiment of the invention.
Figure 3:
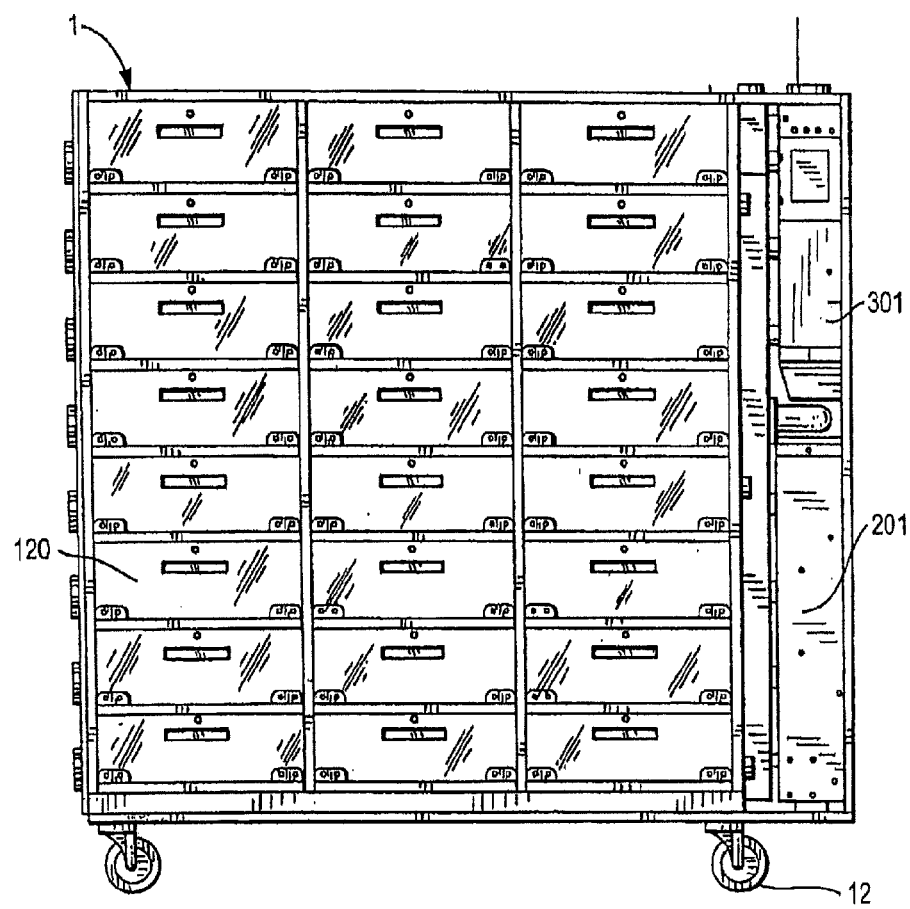
FIG. 3 is a front elevational view of a cage and rack system in accordance with an embodiment of the invention.

Referring to FIGS. 1-3, a ventilated cage and rack system in accordance with an embodiment of the invention includes a rack generally indicated as 1 and one or more cages generally indicated as 5, 5A housed therein. In the interest of simplification, rather than referring to cage 5, 5A, which are simply two different sizes of the cage, reference to a cage used with the cage and rack system in accordance with the invention will be referred to generally as "cage 5". However, it is to be understood that "cage 5A" can be interchangeable with "cage 5" without deviating from the scope of the invention.

Rack 1 preferably comprises one or more shelves generally indicated as 100 suitable for housing containers, such as cages 5, and shelves 100 can include a plurality of runners 110, 111 for supporting cage 5.

In accordance with the embodiments shown in FIG. 1, runners 110 are constructed and arranged to receive two cage 5 having a first width, or a single wide cage 5A having a second width greater than the first width, between two adjacent runners 110. Preferably, runner 111 is positioned between two adjacent runners 110 to facilitate the positioning of two cages 5 while not hindering the positioning of a wider cage between runners 110.

An exemplary embodiment of the invention has shelf 100 separated by one or more dividers 111 into a plurality of zones generally indicated at 130, each zone 130 suitable for receiving two cages 5 or a single wider cage 5A. Each zone 130 includes a door 120 to substantially enclose zone 130 to better prevent the air within shelf 100 from escaping into the atmosphere outside rack 1.

Figure 4:
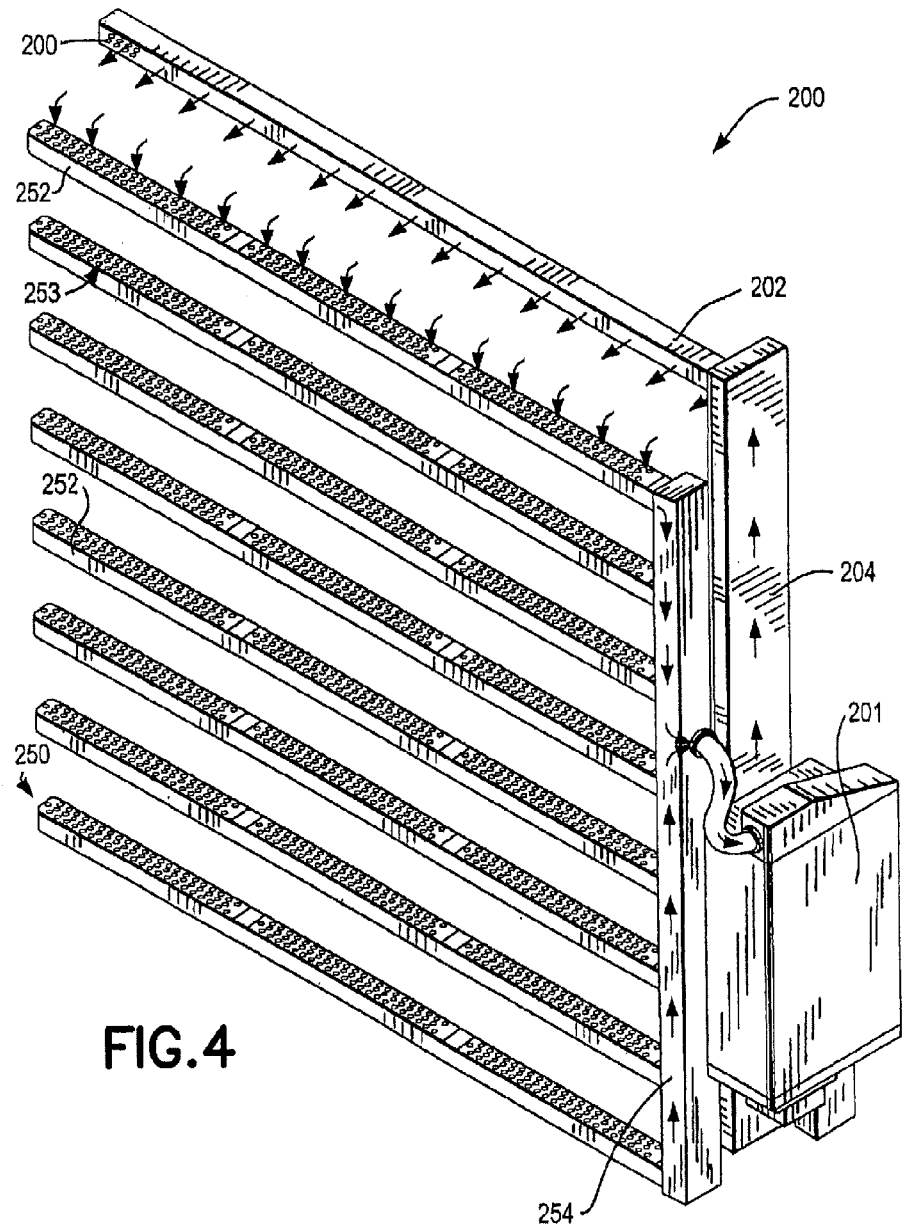
FIG. 4 is a perspective view of an air supply and circulation system in accordance with an embodiment of the invention.

A cage and rack system in accordance with an exemplary embodiment of the invention includes an air supply system generally indicated as 200, as shown in FIG. 4, having an air supply blower 201 providing air through an air supply manifold 204 to a plurality of air supply plenums 202, each plenum providing air to a shelf 100. Preferably, air supply system 200 includes a HEPA filter to supply HEPA filtered air to shelves 100. For example, air supply blower 201 can include a HEPA filter to provide HEPA filtered air to air supply manifold 204, which provides the HEPA filtered air to air supply plenum 202 which supplies the HEPA filtered air to shelf 100.

As shown in FIG. 4, air supply system 200 can cooperate with an air circulation system generally indicated as 250 to recycle the air from within shelves 100. The embodiment of air circulation system 250 as shown includes a plurality of air circulation apertures generally indicated at 253 through which the air from within shelf 100 is extracted. The air enters and travels through an air circulation plenum 252 into an air circulation manifold 254 into the air supply blower 201, wherein the air is HEPA filtered and re-supplied to shelves 100 in the manner described above. An example of the airflow of the air supply and circulation systems 200, 250 is illustrated for rack 1 and top shelf 100 in FIG. 4, wherein the arrows represent the direction of airflow.

Figure 5:
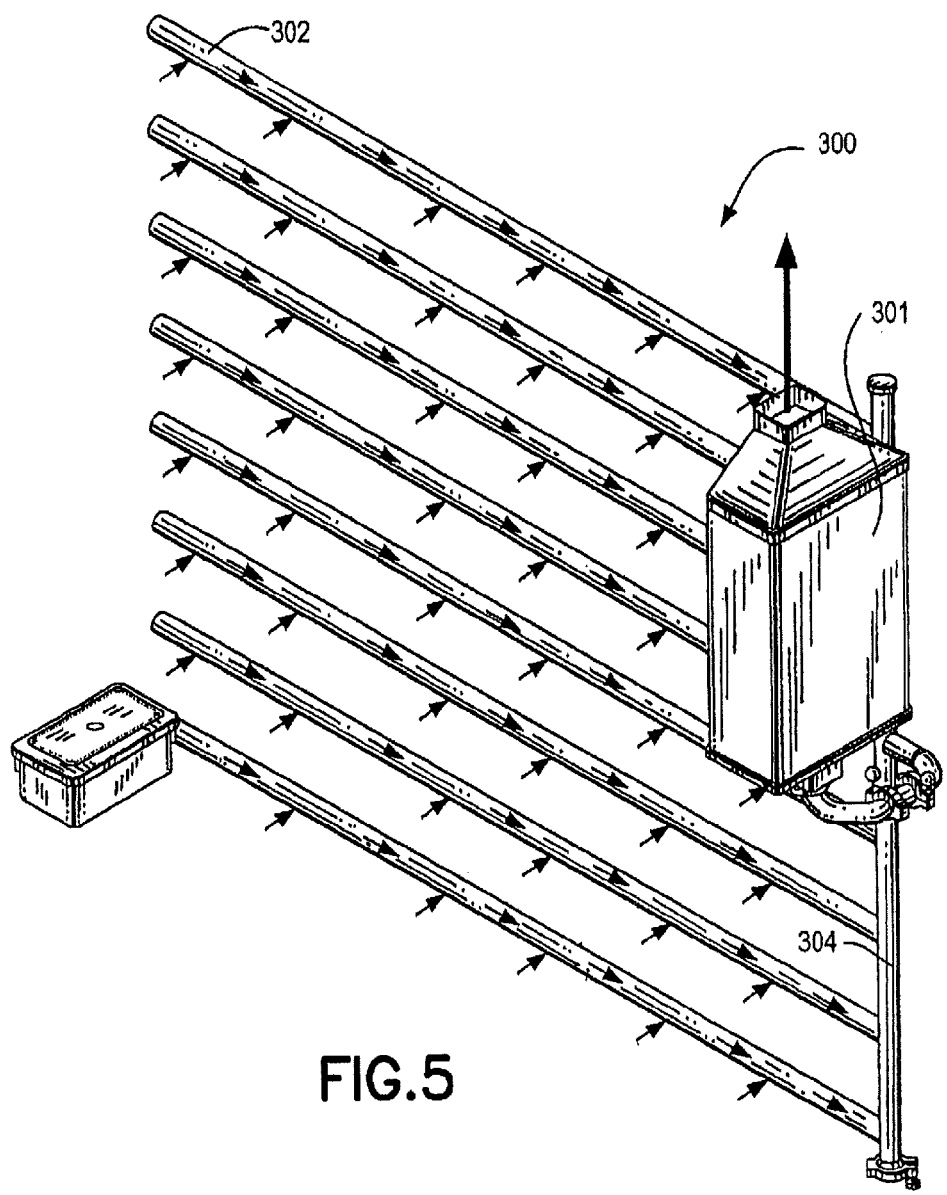
FIG. 5 is a perspective view of an exhaust system in accordance with an embodiment of the invention.

A cage and rack system in accordance with an exemplary embodiment of the invention also includes an exhaust system generally indicated as 300. Referring to FIG. 5, an embodiment of exhaust system 300 includes an exhaust blower 301, which filters and expels air extracted from shelves 100. As shown, air is extracted into exhaust plenum 302, flows through exhaust manifold 304, and into exhaust blower 301. Exhaust blower 301 preferably includes a HEPA filter and expels HEPA filtered air either into the atmosphere, such as the laboratory room or into a vent leading out from the laboratory room.

Referring to FIGS. 6-9, the airflow patterns within an exemplary embodiment of shelf 100 will be described in detail. As illustrated by the arrows in FIGS. 6-9, air enters shelf 100 from air supply plenum 202, which is preferably located toward the top of shelf 100, proximate the rear of shelf 100, the rear for the purpose of this description being the end opposite from door 120. Air supply plenum provides air into shelf 100 via air supply apertures 203 in a lateral direction from the rear of shelf 100 toward the front of shelf 100 in direction A.

Figure 6:
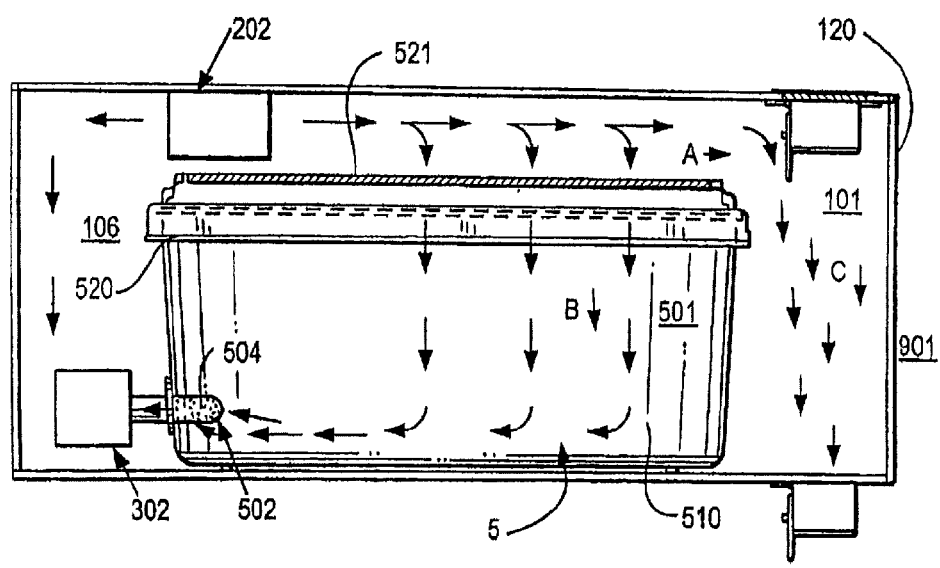
FIG. 6 is a side elevational view of inside a shelf in accordance with an embodiment of the invention.

In accordance with the embodiment illustrated in FIG. 6, when cage 5 is docked to exhaust system 300 within shelf 100, a majority of the air from air supply plenum 202 travels above the top of cage 5 toward the front of shelf 100. As shown, shelf 100 can include a deflector 102 proximate the front of shelf 100 for deflecting the airflow from flowing forward to generally downward. In accordance with an exemplary embodiment, shelf 100 comprises an air circulation plenum 252 proximate the front of shelf 100, more preferably toward the bottom surface of shelf 100 proximate the front of shelf 100. Accordingly, air from air supply plenum 202 travels above cage 5 toward the front of shelf 100 until the air contacts deflector 102 whereupon the airflow changes direction according to the angle of deflector 102.

In the embodiment shown in FIG. 6, the airflow is deflected generally downward in direction C, and enters air circulation plenum 252, thus exiting shelf 100. This deflected airflow preferably creates an air curtain substantially preventing the exchange of contaminants or pathogens through the air curtain. Whereas the embodiment shown includes door 120 to further prevent air from within the shelf 100 from entering the laboratory and the air from the laboratory from entering shelf 100, it is to be understood that other barriers may be used instead of a door. In fact, the air curtain may be sufficient without an additional barrier, and the air pressure of the air curtain may be increased or decreased to provide a stronger or weaker barrier, respectively, depending on the needs of the experiment.

In the embodiment shown in FIG. 6, air supply plenum 202 is located at least partially above cage 5. Accordingly, substantially all the air from air supply plenum 202 flows either above cage 5 in direction A or into cage 5 in direction B. Additionally, a small amount of air substantially less than the air flowing in direction A can be directed into the area behind cage 5, generally indicated at 106, to preclude a void from being created in area 106. If a void were to exist, air from elsewhere within shelf 100 might enter the void. Most likely, the air that would enter a void in area 106 would come from different zones within shelf 100, thus increasing the potential of cross contamination. By providing a small amount of air in area 106 and thus avoiding creating a avoid in area 106, one exemplary embodiment of the invention assists in preventing cross-contamination. In accordance with the embodiment shown in FIG. 6, the air to area 106 is provided through the side of air supply plenum 202 opposite the side from which air is provided in direction A above cage 5.

As described above, the air exiting shelf 100 can be circulated into air supply blower 201 to be filtered and supplied back into shelves 100. Alternatively, the air circulation plenum 252 can cooperate with exhaust system 300 to expel the air from shelf 100 instead, as a matter of application specific to design choice, without deviating from the scope of the invention.

Additionally, whereas the airflow within shelf 100 is illustrated as generally forward and downward, shelf 100 may include an air supply plenum or air circulation plenum proximate top or bottom, the front, rear or anywhere along the depth of shelf 100 without deviating from the scope of the invention, as a matter of application specific to design choice. Furthermore, it is to be understood that an air curtain includes any barrier created by airflow sufficient to prevent the passage of a contaminant or pathogen from one side of the air curtain to the other side of the air curtain. Whereas the air curtain described in accordance with the embodiments described herein comprises vertical airflow, it is to be understood that the air curtain may comprise airflow that is horizontal, diagonal, straight or curved, etc. without deviating from the scope of the invention.

Figure 7:
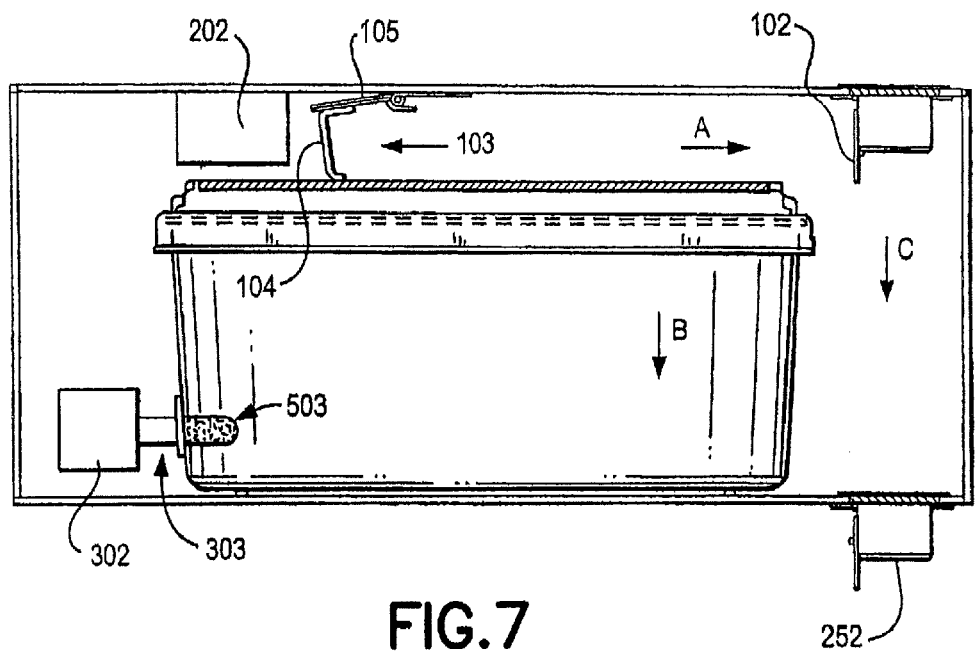
FIG. 7 is a side elevational view of inside a shelf in accordance with an embodiment of the invention.
Figure 8:
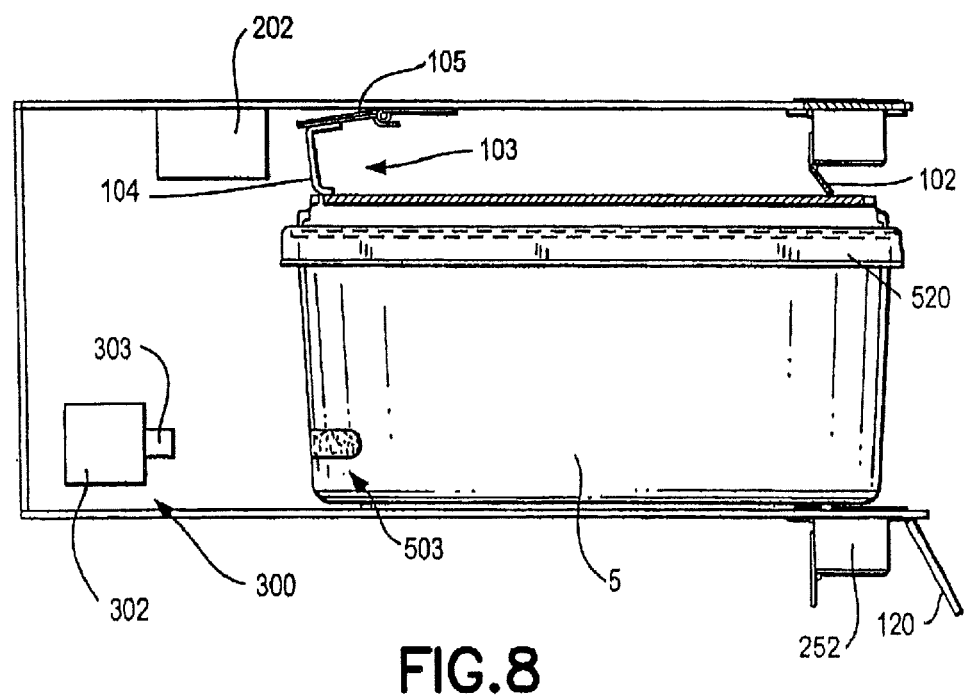
FIG. 8 is a side elevational view of inside a shelf in accordance with an embodiment of the invention.
Figure 9:
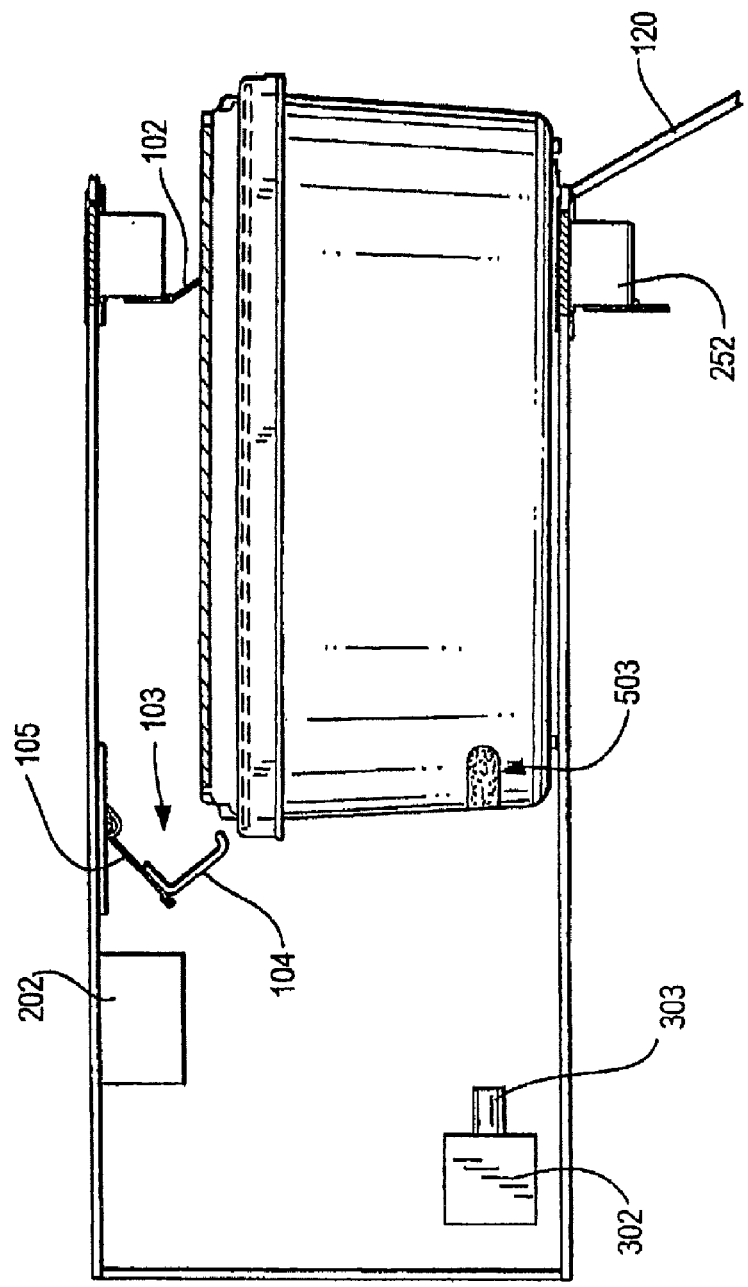
FIG. 9 is a side elevational view of inside a shelf in accordance with an embodiment of the invention.
Figure 13:
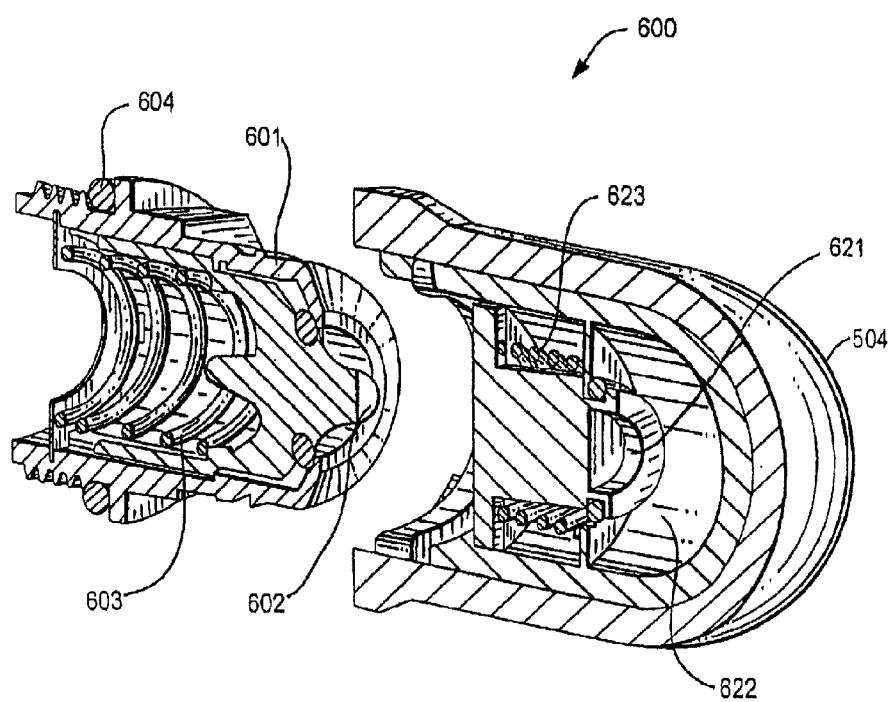
FIG. 13 is a reverse perspective cross sectional view of the valve assembly of FIG. 12 taken along D-D.

FIGS. 7-9 illustrate an exemplary embodiment of the invention at three separate stages as cage 5 is being removed from shelf 100. Referring to FIG. 7, shelf 100 is shown with cage 5 docked in place, wherein cage 5 is connected to exhaust system 300. Preferably, exhaust system includes an exhaust valve 303 connected to exhaust plenum 302. The exhaust valve connects with cage valve 503 to extract air from within cage 5 to be expelled through exhaust system 300 as described above. It may be desirable for cage valve 503 to be covered by a cage valve filter 504 to filter the air being withdrawn from cage 5. For example, cage valve filter 504 can prevent cage dressing or other articles that may clog air exhaust plenum 302 or otherwise hinder the performance of exhaust system 300. Preferably cage valve filter 504 is removably mounted to cage valve 503, for example, threadingly engaged to cage valve filter 504 as shown in FIG. 13.

In the embodiment shown, deflector 102 is positioned to deflect air from air supply plenum 202 downward toward air circulation plenum 252 to create an air curtain as described above. Additionally, an air director 103 is in the up position, wherein air from air supply plenum 202 is permitted to flow laterally above cage 5.

Figure 10:
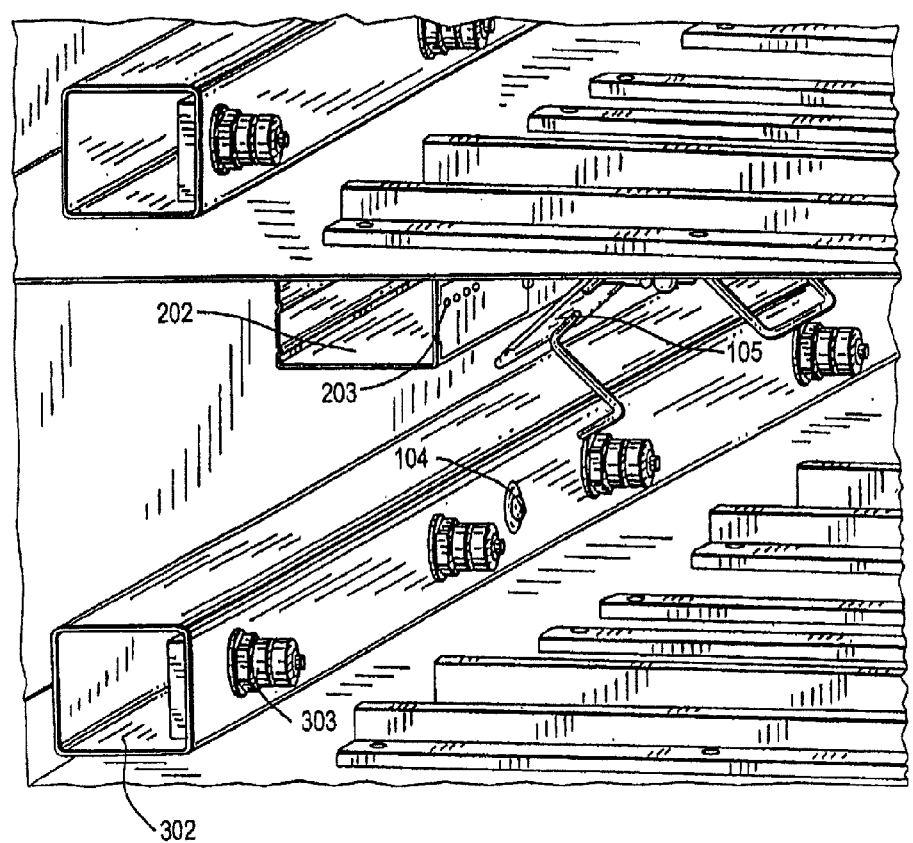
FIG. 10 is a sectional view of a portion of a shelf in accordance with an embodiment of the invention.

In accordance with an embodiment of the invention, air director 103 comprises one or more levers 104 connected to a diverter 105, wherein cage 5 contacts and pushes lever 104 upward when being inserted, and maintains lever 104 in the upward position as long as cage 5 is below lever 104, resulting in air director 103 being maintained in the up position. It may be preferable for air to be able to flow through or past levers 104 without substantial resistance, so that the air can flow generally in direction A until it deflects off diverter 105. Therefore, when air director 103 is in the up position as shown in FIG. 7, air can flow in direction A, past or through lever 104 toward deflector 102, whereupon the airflow changes direction toward air circulation plenum 252, thus forming the air curtain as described above. In the embodiment shown, door 120 remains closed, thus assisting in preventing the flow of air into or out of shelf 100. Referring to FIG. 10, air director 103 can comprise two or more levers 104 connected to a flat, planar, solid diverter 105. Alternatively, lever 104 can comprise a single hollow member through which air can flow, or a rod like member past which air can flow without substantial deflection. Other shapes and arrangements of lever 104 can be selected as a matter of application specific to design choice.

Additionally, as described above, air also flows into cage 5 in direction B, as it flows above cage 5. Preferably, cage 5 includes a cage bottom 510 and a cage top 520 having one or more apertures through which air can pass. Therefore, when there is no positive or negative air pressure in or outside the cage, natural exchange of air can occur between cage 5 and the atmosphere outside cage 5, thus rendering cage 5 a static cage, wherein air exchange can occur without external pressure, and lacks either negative or positive pressure within the cage. In accordance with a preferred embodiment as shown in FIG. 6, cage top 520 includes a cage top filter 521 for filtering the air entering and exiting cage 5. Examples of straightforward static cages, lacking cage valve 503 for connecting to an exhaust system as provided with certain embodiments of the invention, include One Cage™ Micro-Isolator™, Super Mouse 750™ Micro-Isolator™ and Super Mouse 1800™ AllerZone™ commercialized by Lab Products, Inc., which have an air change per hour (ACH) of about 7. These static cages are usually left out in the open in the laboratory in open racks, which can facilitate natural air exchange between the cage and the laboratory room. Additionally, because there is no source of air within the cage, a static cage helps avoid air from within the cage entering the atmosphere in which it is located, such as the laboratory room.

Figure 11:
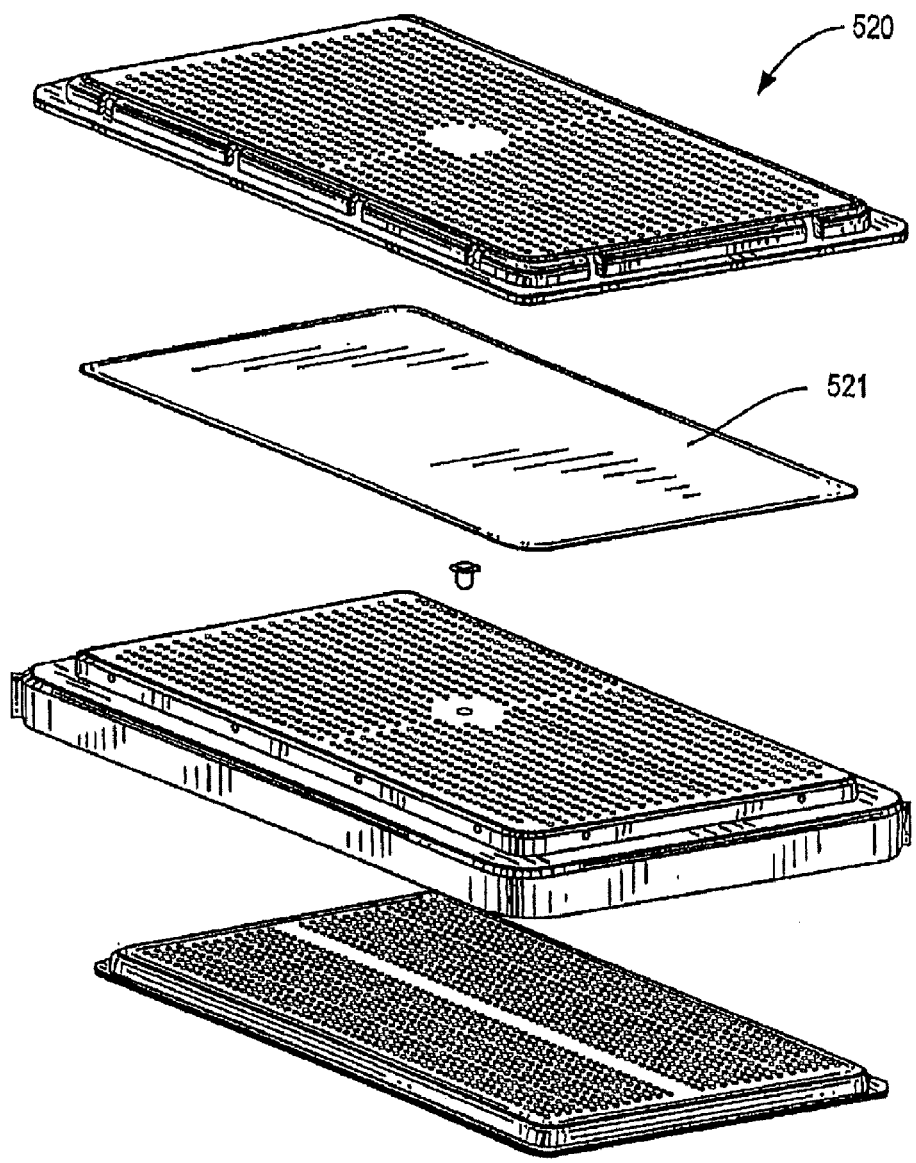
FIG. 11 is an exploded front perspective view of a cage top in accordance with an embodiment of the invention.

Referring to FIG. 11, one embodiment of cage top 520 includes a filter top adapted to cover the open top of the open-top cage, wherein the filter top has a body portion with a perforated filter-top top wall and filter-top side walls extending therefrom to form an open bottom end. An example of an acceptable filter top is disclosed in U.S. Pat. No. 6,227,146, which is incorporated by reference in its entirety. Cage top 520 can also include a shield, preferably is permanently affixed to the filter-top top wall, the shield further having a shield side wall, a shield flange, a plurality of spacers extending from the shield side walls. It may be preferable to provide a plurality of dimples extending from the shield flange to maintain the shield at a predetermined distance from the filter top. It is to be understood that cage top 520 need not include the structures described above but can include any variety of structures and designs as a matter of application specific to design choice, without deviating from the scope of the invention. For example, cage top 520 can include a lock for retaining cage in place, preferably exerting sufficient pressure to substantially prevent the exchange of air between cage top 520 and cage bottom 510. In accordance with an exemplary embodiment, the cage lock is relatively easy to open by a laboratory personnel wearing gloves and does not create substantive noise when locking or unlocking.

Referring to FIGS. 6-7, air enters cage through cage top 520, filtered by cage top filter 521, at least partially due to the negative air pressure in cage 5 created by exhaust system 300. When exhaust valve 303 and cage valve 503 are connected, air is withdrawn from cage 5, causing a negative air pressure in cage 5 with respect to shelf 100. Therefore, air passing above cage 5 is at least partially drawn into cage 5. Therefore, fresh HEPA filtered air can be supplied into cage 5.

Additionally, cage valve 503 is preferably located proximate the bottom of cage 5, which can maximize airflow within cage 5. Because air is drawn in from the top of cage 5, along the entire surface of cage top 520, fresh HEPA filtered air is provided to substantially the entire area of cage 5 from the top of cage 5 downward toward cage valve 503. In cages having both an air supply valve and an exhaust valve within the cage, it is possible that the volume of the path traveled by the fresh air is substantially less than the volume of the cage. For example, if the air supply valve is located toward the top of the cage and the exhaust valve is located on the same side toward the bottom of the cage, the air can flow the short distance between the valves, perhaps deflected by the feeding assemblies or other components within the cage. There is a risk that the fresh air does not reach the far end of the cage, where the animal may spend a significant amount of time. Similar problems can arise even if the locations of the valves are altered. Accordingly, by providing a filtered cage top 520 through which air can flow into cage 5 utilizing substantially the entire area of filtered cage top 520 and an exhaust valve 503 proximate the bottom of cage 5, a substantially efficient airflow pattern within cage 5 can be maintained. Additionally, providing cage valve 503 proximate the bottom of cage 5 where the animal spends most of its time and where most of the waste is created and collected can enhance the removal of ammonia and other wastes.

Accordingly, the air within shelf 100 is maintained substantially segregated from the air within cage 5 due to the negative pressure within cage 5. Furthermore, at least because of the air curtain formed toward the front of shelf 100 and door 120, the air from within shelf 100 is maintained substantially segregated from the air external from shelf 100, for example, in the laboratory room. Thus, the embodiment of the invention described can provide three zones of air quality:

First, cage zone 501 within cage 5 comprises HEPA filtered air with whatever contaminants, pathogens, etc., that may be present within cage 5, depending on the experiment.

Second, shelf zone 101 within shelf 100 external to cage 5, comprises mainly HEPA filtered air, which can comprise a small amount, preferably not more than a nominal amount, of contaminants, pathogens, etc., that may have entered zone 101 from within cage 5.

Cage zone 501 preferably comprises negative pressure with respect to shelf zone 101, mostly provided by exhaust system 300 drawing air out of cage 5. Thus, air will be inclined to flow into cage 5 rather than out of cage 5. Therefore, a system in accordance with an embodiment of the invention provides a substantially effective system in which air and contaminants, pathogens, etc. from cage zone 501 will not enter shelf zone 101, or at least making such a movement of air and contaminants, pathogens, etc. from cage zone 501 into shelf zone 101 difficult, preferably improbable, most preferably impossible.

The third zone can be atmosphere zone 901, which often comprises non-REPA filtered, non-contaminated air in which the cage and rack system is maintained. Because laboratory personnel occupy atmosphere zone 901, it is desirable to maintain atmosphere zone 901 as free as possible from contaminants, pathogens, etc., that may be within cage 5.

Shelf zone 101 preferably comprises negative pressure with respect to atmosphere zone 901, mostly provided by air circulation system 250 extracting air through air circulation plenum 252 proximate the front of shelf 100, most preferably proximate door 120 of shelf 100. Air circulation plenum preferably not only extracts air from within shelf 100 but also a small amount of air from atmosphere zone 901, thus maintaining a negative pressure with respect to atmosphere zone 901. Preferably, the negative pressure is not too strong, to substantially prevent the air from atmosphere zone 901 from entering shelf 100 beyond air circulation plenum 202.

Preferably, in accordance with an exemplary embodiment, door 120 and shelf 100 are constructed and arranged to permit a small volume of air to be drawn in from atmosphere zone 901 into air circulation plenum 252. This can provide a plurality of benefits. For example, the air from atmosphere zone 901 entering shelf 100 and immediately being extracted into air circulation plenum 252 located proximate door 120 may create a second air curtain, the first air curtain being formed by the HEPA filtered air from air supply plenum 202 being deflected toward air circulation plenum by deflector 102. This can double the barrier which contaminants, pathogens, etc. must cross in order to enter atmosphere zone 901 from shelf zone 101 or vice versa.

An additional benefit of permitting air to enter from atmosphere zone 901 into air circulation plenum 252 is the balance of air circulation. When cage 5 is docked in place, more specifically, when cage valve is connected to exhaust valve 303, air is being drawn in from shelf zone 101 into cage 5 and thereafter removed from cage 5, and the volume of air removed by exhaust system 300 is lost from the air supply and circulation system. In order to maintain the air pressure of air supply system 200, adjustments must be made constantly as cages are inserted and removed from rack 1. However, by extracting air from atmosphere zone 901, the air lost through exhaust system 300 can be captured from atmosphere zone 901 to maintain the desirable air pressure of air supply system 200 and air circulation system 250.

Therefore, a system in accordance with an embodiment of the invention provides a substantially effective system in which air and contaminants, pathogens, etc. from shelf zone 101 will not enter atmosphere zone 901, or at least making such a movement of air and contaminants, pathogens, etc. from shelf zone 101 into atmosphere zone 901 difficult, preferably improbable, most preferably impossible.

By providing a three zone system, a cage and rack system in accordance with an embodiment of the invention substantially minimizes the risk of contaminants, pathogens, etc. from cage 5 entering into the atmosphere, such as a laboratory room where laboratory personnel may be, thus substantially protecting the laboratory personnel from the contaminants, pathogens, etc. Likewise, the animal housed in cage 5 is substantially protected from contaminants, pathogens, etc. that may be present in the laboratory room that is not intended to be introduced into the cage in accordance with the experiment being conducted.

Reference is now made to FIG. 8, wherein cage 5 is being removed from shelf 100 in accordance with an embodiment of the invention. As shown, door 120 is opened, and cage 5 is moved away from exhaust plenum 302, thus disassociating cage valve 503 from exhaust valve 303. Therefore, air is no longer being withdrawn from cage 5, and thus air is no longer being drawn into cage 5 through cage top 520. Rather, cage 5 becomes a static cage wherein air is exchanged with the atmosphere outside cage 5 via natural air exchange. As shown, the top of cage 5 contacts deflector 102 and pushes is outward, maintaining contact with deflector 102 to prevent air from flowing under deflector 102 and out into the laboratory room. Preferably, cage top 520 still contacts lever 104 and maintains air director 103 in the up position, thus permitting air to continue to flow above cage 5. Accordingly, a majority of the air deflects off deflector 102 and into cage 5.

Reference is now made to FIG. 9, wherein cage 5 is pulled out further from shelf 100 than in FIG. 8, in accordance with an embodiment of the invention. As shown, lever 104 is no longer supported by cage 5, and air director 103 is in the down position. In accordance with an embodiment of the invention, air director 103 remains in the down position unless it is urged upward into the up position, for example, by cage 5 supporting lever 104 one cage top 520. Therefore, the removal of cage 5 can permit air director 103 to return to the down position. Once in the down position, diverter 105 preferably substantially prevents air from flowing through or past diverter toward the front of shelf 100. Rather, substantially all the air from air supply plenum is deflected off diverter 105 generally downward, for example, toward exhaust plenum 302 behind cage 5, as shown.

By preventing the flow of air toward the front of shelf 100, air director 103 can substantially prevent air from being pushed toward the laboratory personnel removing cage 5, and maintaining the air within shelf 100 instead of exiting shelf 100 once cage 5 is removed. Air director 103 provides another benefit. By substantially preventing air from flowing toward the front of shelf 100, air director 103 substantially prevents air from being deflected off deflector 102 and into cage 5 through cage top 520. It is desirable to avoid this effect because when cage 5 releases lever 104, cage 5 is partially outside shelf 100. Therefore, portions of cage 5 are on either side of deflector 2. Therefore, if air was permitted to flow toward deflector 102, the air would deflect off deflector 102 and pushed into the portion of cage 5 located within shelf 100, which would likely result in air being pushed out of cage 5 through the portion of the top of cage 5 located outside shelf 100, thus likely blowing air from cage 5 into the laboratory personnel removing cage 5 from shelf 100 and into the atmosphere. In accordance with an embodiment of the invention, because air from cage 5 is neither being withdrawn through cage valve 503 nor pushed in through cage top 520, natural air exchange can occur between cage 5 and the shelf or laboratory room, or both, depending on the position of cage 5.

Air that is being directed downward behind cage 5 in FIG. 9 can flow toward and into air circulation plenum 252 once cage 5 is sufficiently removed from shelf 100 and apertures 253 of air circulation plenum 252 are exposed. Preferably the negative air pressure of air circulation plenum 252 is sufficiently strong to substantially prevent the air from within shelf 100 from exiting shelf 100 into the laboratory room. Additionally, because air is filled in shelf 100 behind cage 5, air from atmosphere zone 901 is substantially prevented from entering shelf 100. Such a phenomenon would be expected if the area behind cage 5 were void, because it would be natural for air to seek to fill a void. By filling the area behind cage 5 with the air from air supply plenum 202, this can be avoided.

Referring to FIG. 10, shelf 100 can include an exhaust valve 303 connected to exhaust plenum 302, the exhaust valve 303 constructed and arranged to connect to cage 5, as discussed above. Because the air within cage 5 is likely contaminated, it may be desirable to ensure that substantially no air, preferably no air whatsoever, from cage 5 enters shelf zone 101. Therefore, it may be desirable to ensure that there is no leak or spillage of air when connecting exhaust valve 303 and cage valve 503.

Figure 12:
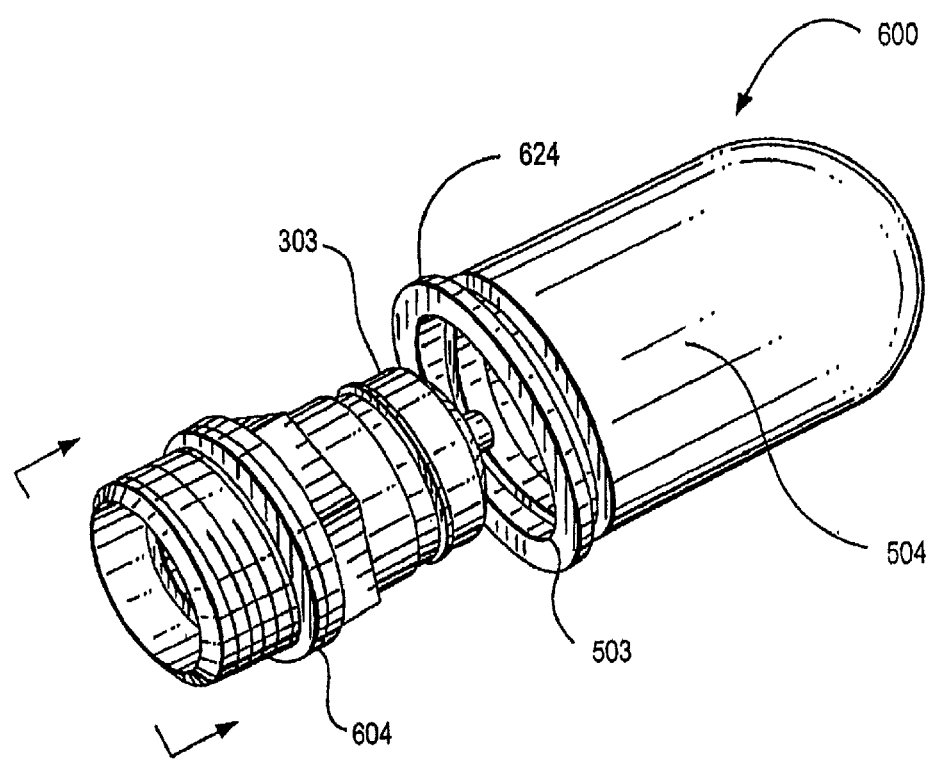
FIG. 12 is an exploded view of a valve assembly in accordance with an embodiment of the invention.

In accordance with one embodiment of the invention illustrated in FIGS. 12-13, exhaust valve 303 and cage valve 503 engage in a three-step process. When being connected, a seal is created between cage valve 503 and exhaust valve 303 first, creating an air pocket between exhaust valve 303 and cage valve 503. Then, as cage valve 503 and exhaust valve 303 are drawn closer together, exhaust valve 303 is activated, thus drawing in whatever residual air was present between cage valve 503 and exhaust valve 303 into exhaust plenum 302. Thus a vacuum is created between cage valve 503 and exhaust valve 303. Therefore, once the connection between cage valve 503 and exhaust valve 303 is perfected and cage valve 503 is opened, there is no air between cage valve 503 and valve 303 that can enter cage 5 via cage valve 503, and air from cage 5 can be extracted through cage valve 503, then exhaust valve 303, into exhaust plenum 302 to be HEPA filtered and expelled from the cage and rack system.

In accordance with an exemplary embodiment of the invention, the three-step process occurs in reverse when cage 5 is undocked and cage valve 503 is disassociated from exhaust valve 303. First, as cage valve 503 is pulled away from exhaust valve 303, cage valve 503 is closed, thus preventing the flow of air to or from cage 5. Exhaust valve 303, however, continues to draw air in, thus removing the residual air between cage valve 503 and exhaust valve 303. This can be important since this residual air came from within cage 5, which likely contains contaminants, pathogens, etc. Whereas the air was filtered through cage valve filter 504, it is likely not a HEPA and the air contains the contaminants, pathogens, etc. Therefore, if this residual air, even if in minor amounts, is released into shelf zone 101, the contaminants, pathogens, etc. can either circulate and cross contaminate other cages in shelf 100, or exit shelf 100 into atmosphere zone 901, thus placing the laboratory personnel at risk. Whereas a system in accordance with the invention substantially prevents the flow of air from within shelf 100 from entering atmosphere zone 901, it is preferable to reduce all possible risks. Therefore, it may be desirable to prevent the residual air from entering shelf zone 101. Because exhaust valve 303 continues to draw air into exhaust plenum 302, the residual air is removed from the area between exhaust valve 303 and cage valve 503, and a vacuum is created once again. Subsequently, exhaust valve 303 is closed, and thus stops extracting air into exhaust plenum 302. Finally, the seal between exhaust valve 303 and cage valve 503 is broken, releasing cage 5 from exhaust plenum 302.

Accordingly, the three step valve system substantially eliminates the risk of spillage of air into or from cage 5, thus maintaining the integrity of shelf 100 and thus rack 1 and further ensuring the safety of the animals housed in cage 5 and in other cages within shelf 100, as well as the laboratory personnel in the laboratory room where rack 1 is located.

To avoid air spillage, the three-step valve should perform in the manner and sequence described above. An embodiment of a suitable valve assembly 600 is shown in FIGS. 12-13. Referring to FIGS. 12-13, a seal can be created between exhaust valve 303 and cage valve 503 by inserting exhaust valve 303 into cage valve 503. Cage valve 503 can have a cage valve sealing member 624 which engages an exhaust valve sealing member 604 of exhaust valve 303 to create a seal therebetween.

Referring to the embodiment of valve assembly 600 shown in FIGS. 12-13, exhaust valve 303 includes a displaceable head 601 having a projection 602. Exhaust valve 303 also includes an exhaust spring 603 which applies a biasing force on displaceable head 601 outward and away from exhaust plenum 302. When sufficient pressure is applied on projection 602 toward exhaust plenum 302, displaceable head 601 can retract toward exhaust plenum 302 to permit air to be drawn into exhaust plenum 302. Similarly, cage valve 503 can also include a displaceable plug 621 which is spring biased by a plug spring 623 in the closed position. Once the bias force of spring 623 is overcome, a portion of displaceable plug 621 can extend past a stopper 622 to permit air to travel through cage valve 503. Preferably, displaceable plug 621 contacts projection 602 and pushes displaceable head 601 to open exhaust valve 303. Once exhaust valve 303 is fully opened, displaceable head 601 can no longer be displaced and applies a pressure on displaceable plug 621 to open cage valve 503.

In order to obtain the 3-step performance described above, exhaust spring 603 preferably has a lower pressure threshold than plug spring 623, thus ensuring that exhaust spring 603 retracts first before plug spring 623 retracts. Therefore, exhaust valve 303 can be opened before cage valve 503 is opened.

Additionally, in accordance with an exemplary embodiment of the invention, a sufficient amount of time is permitted to pass after exhaust valve 303 opens before cage valve 503 opens, to ensure that all the air trapped between exhaust valve 303 and cage valve 503 has been extracted by exhaust valve 303. One possibility is to alter the distance traveled by displaceable plug 621 before opening cage valve 503. A longer distance may slow down the docking process after exhaust valve 303 has been opened, thus permitting air to be extracted for a longer period of time before cage valve 503 is opened. Likewise, a longer distance may slow down the undocking process after cage valve 503 has been closed, thus permitting air to be extracted for a longer period of time before the seal between cage valve 503 and exhaust valve 303 is broken.

Another suitable way to ensure proper evacuation of air between cage valve 503 and exhaust valve 303 is to delay or mechanically slow down the closing process of exhaust valve 303 during undocking. Alternatively, exhaust valve 303 can remain at least partially extracting air even after cage valve 503 is completely separated from exhaust valve 303.

Additionally, an extra step may be inserted before, during or after the three steps described above without deviating from the scope of the invention. For example, an extra step may be performed between the opening or closing of the exhaust valve and the closing or opening of the cage valve. By adding an additional step therebetween, it may facilitate avoiding spillage, by ensuring that the exhaust valve continues to withdraw air for a longer period of time before either the cage valve is opened or the seal broken.

In accordance with an exemplary embodiment of the invention, the cage and rack system comprises a dock confirmation system to indicate that cage 5 is completely and properly docked to exhaust system 300, more specifically, that the connection between exhaust valve 303 and cage valve 503 has been perfected. By way of non-limiting example, a confirmation system can provide an audible click or a resistance that is overcome when the connection is perfected. Alternatively, a visual indication can be provided. Referring to FIGS. 7-9, an embodiment of deflector 102 contacts the top of cage 5 when cage 5 is being inserted into shelf 100. Preferably, deflector 102 pivots inward as cage 5 is being inserted. Preferably, deflector 102 is constructed and arranged so that deflector 102 is released by cage 5 and permitted to pivot downward only once cage 5 is properly docked and the connection between cage valve 503 and exhaust valve 303 has been perfected. Such a visual and physical indication can help eliminate error in docking cage 5 onto exhaust system 300.

Figure 14:
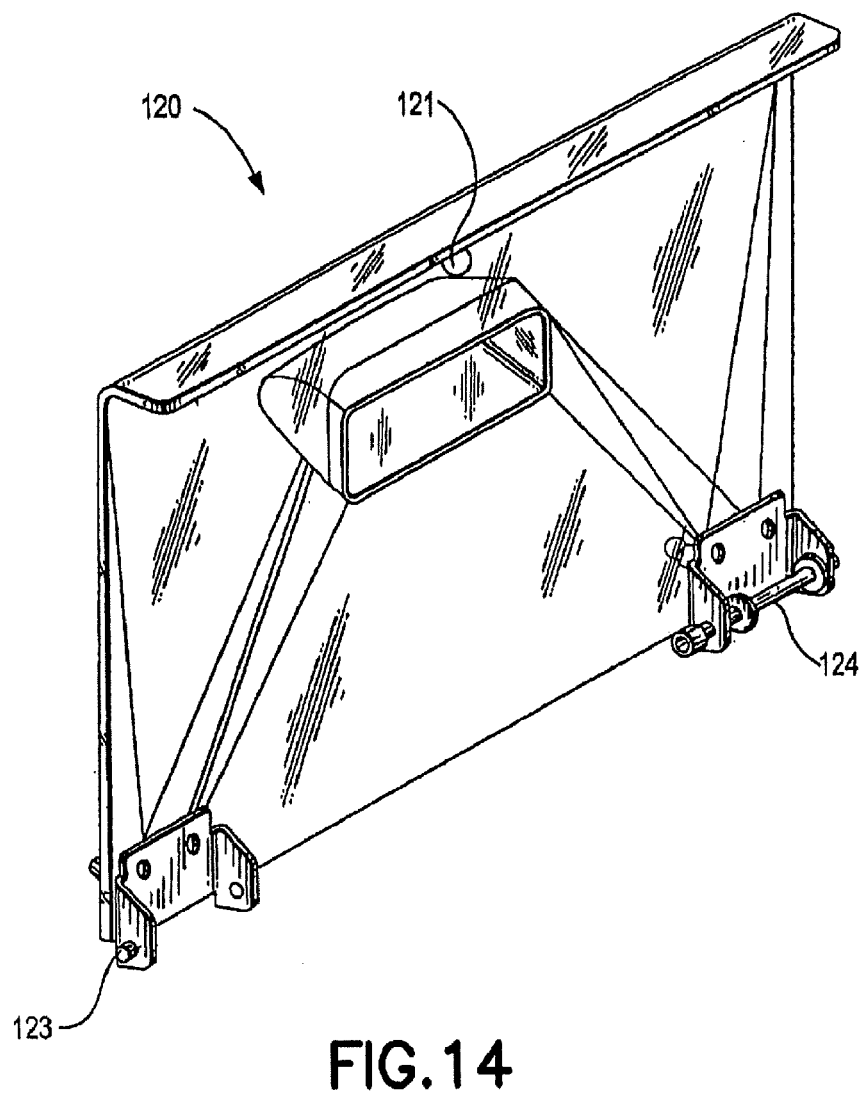
FIG. 14 is a perspective view of a door in accordance with an embodiment of the invention.

Referring to FIG. 14, door 120 is preferably formed of an autoclavable material, preferably a material that is light and resilient, such as polysulfone. In accordance with the embodiment shown, when being opened or closed, door 120 pivots about pins 123, 124 inserted into corresponding apertures in a sidewall 10 or a divider 11 of rack 1 of FIG. 1. Preferably, door 120 pivots outward to open, and does not obstruct the path of cage 5 as cage 5 is being inserted or removed from zone 130, as illustrated in FIGS. 7-9. It is preferable for door 120 to be light and resilient enough so that pulling door 120 to open it and permitting it to drop will not cause significant noise, which is preferable for both laboratory personnel as well as the animals housed in the cage and rack system.

In the embodiment shown in FIG. 14, pin 123 is fixed to door 120 whereas pin 124 is movable between an extended position for extending into the corresponding aperture in the divider 11 or side wall 10, and a retracted position wherein pin 124 is no longer extending into the aperture. By providing a retracting pin 124, the removal of door 120 from rack 1 can be facilitated, for example, for cleaning, autoclaving and replacing door 120. Additionally, at least for ease of cleaning and autoclaving, it is preferable for door 120 to have a handle comprising a recess in door 120, either inward or outward. Preferably, pin 124 is spring biased in the extended position, wherein a spring urges pin 124 into the extended position to substantially eliminate the risk of pin 124 and thus door 120 from being inadvertently removed.

The opening and closing of door 120 can be facilitated by a magnetic closure 122 which magnetically attaches to a corresponding metal tab in zone 130 to hold door 120 in the closed position. Because the magnetic closure 121 substantially eliminates the need for latches or other cumbersome locking mechanisms, door 120 can easily be opened and closed by laboratory personnel who may be wearing relatively thick gloves.

Additionally, as shown in FIG. 1, door 120 can be transparent to permit the cages to be observable with door 120 closed. Preferably, cage 5 is also transparent and the animal within cage 5 can be observed from within cage 5 in rack 1 with door 120 closed. Alternatively, as shown in FIG. 3, door 120 need not be transparent, according to the needs of the laboratory.

Figure 15:
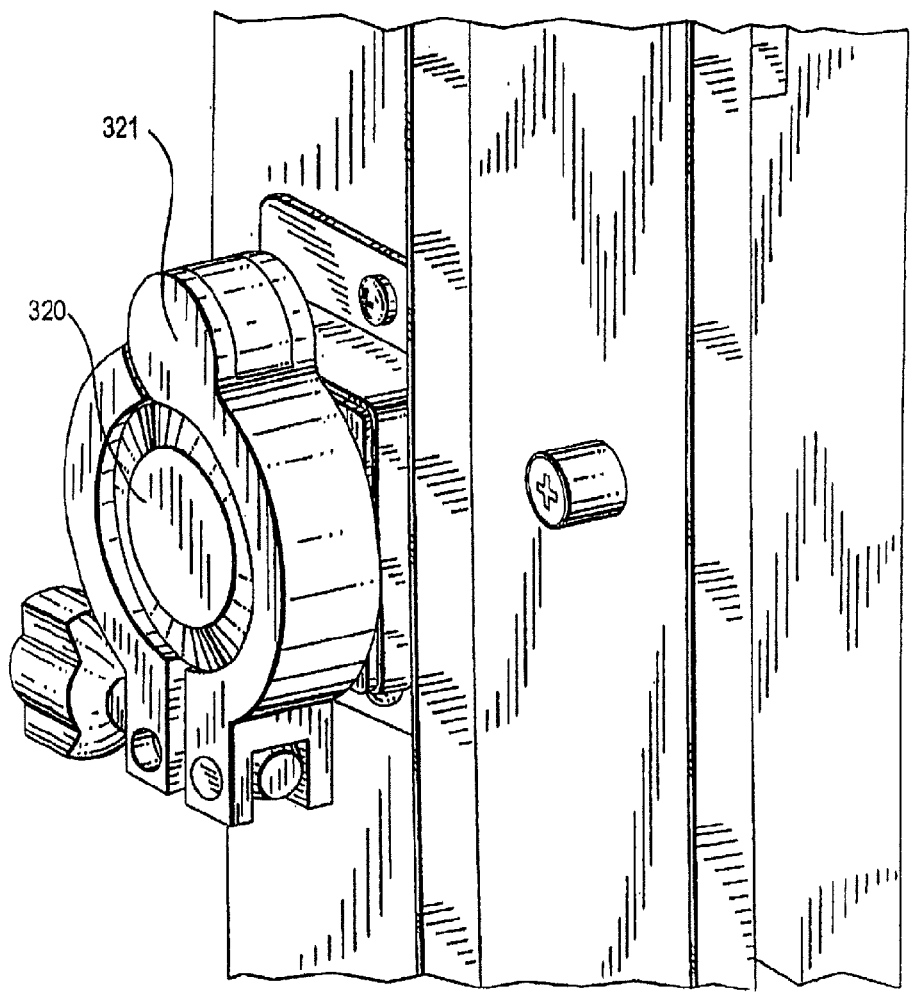
FIG. 15 is a perspective sectional view of a portion of a rack in accordance with an embodiment of the invention.

In order to facilitate cleaning and/or autoclaving of the system, exhaust plenum 302 preferably extends outside shelf 100, where exhaust plenum 302 is sealed by an exhaust cap 320. In the embodiment shown in FIG. 15, exhaust cap 320 comprises a vice like lock 321 which enhances the seal between exhaust cap 320 and exhaust plenum 302 by maintaining an effective pressure on exhaust cap 320 to prevent air from escaping from within exhaust plenum 302 into the atmosphere. Once rack 1 is being washed or autoclaved, exhaust cap 320 can be removed, for example, by loosening and/or removing lock 321. Therefore, the inside of exhaust plenum 302 can be exposed for direct cleaning. Additionally, providing exhaust cap 320 can facilitate fixing problems with exhaust plenum 302, such as blockage. If something is blocking exhaust plenum 302, which can hinder the withdrawal of air from within cage 5, exhaust cap 320 can be removed, the problem assessed and resolved, for example, by removing whatever it is that is blocking exhaust plenum 302. It is notable, however, that even if the extraction of air from cage 5 is hindered, because cage 5 comprises an open filtered cage top 520, HEPA filtered air can continue to enter and exit cage 5 via natural air exchange, and therefore the health of the caged animal is not substantially compromised.

Additionally, it may be preferable to vary the number, size, and/or arrangement of air supply apertures 203 depending on the need of the cage and rack system. For example, if shelf 100 is relatively long, the pressure within air supply plenum 202 can vary. Because the air is being blown toward the end of air supply plenum 202 opposite from air supply manifold 204, the air pressure can be greater toward the end of air supply plenum 202 opposite from air supply manifold 204 than proximate air supply manifold 204. Accordingly, it may be beneficial to provide a greater number of or larger air supply apertures 203 on air supply plenum 202 closer to air supply manifold 204 than further away from air supply manifold 204. By way of non-limiting example, a shelf 100 having three compartments 130 as shown in FIG. 1 can have a gradually decreasing number of air supply apertures 203 along air supply plenum 202 from proximate air supply manifold 204 to the end opposite air supply manifold 204. Such an arrangement can facilitate providing consistent air pressure throughout shelf 100. The same can apply when rack 1 includes a sufficient number of shelves wherein the air pressure along air supply manifold 204 varies. In order to address the inconsistent air pressure, the width of air supply plenum 202 can be varied. Additionally, air supply apertures 203 can be limited to areas on air supply plenum 202 that are designed to be positioned directly above cage 5, thus not supplying air where cage 5 will not be located, such as the area of shelf 100 aligned with divider 11. It is to be understood that other variations in air supply system 200 are possible in accordance with the invention.

Figure 16:
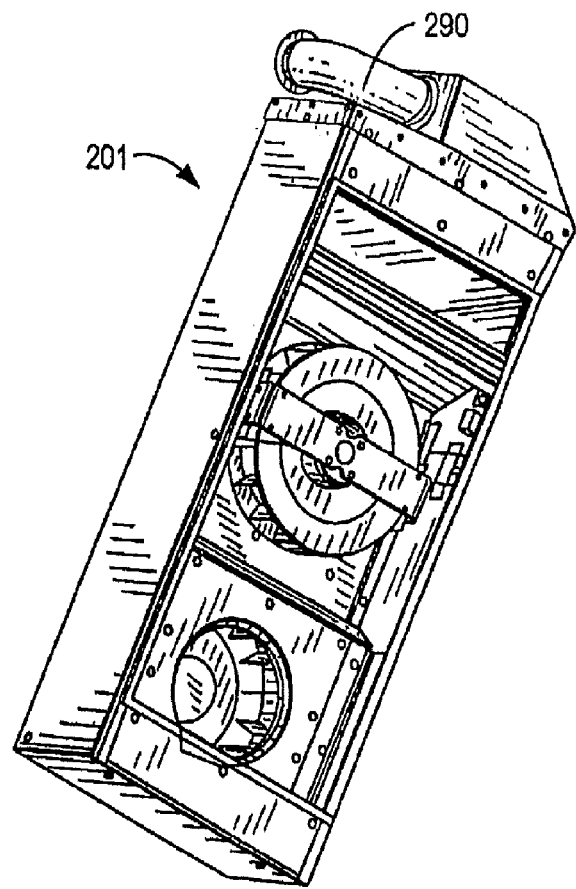
FIG. 16 is a perspective view of an air supply blower in accordance with an embodiment of the invention.
Figure 17:
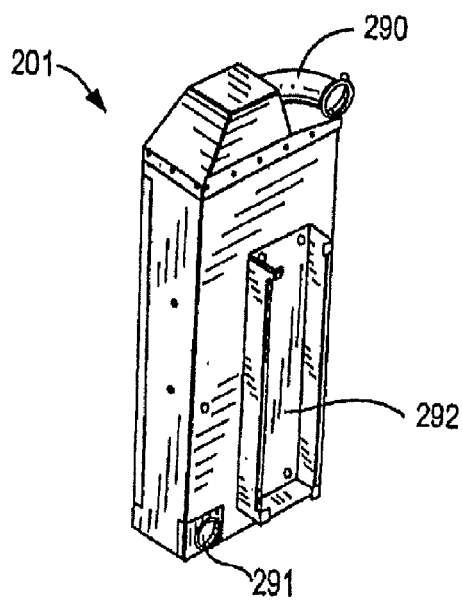
FIG. 17 is a perspective view of an air supply blower in accordance with an embodiment of the invention.
Figure 18:
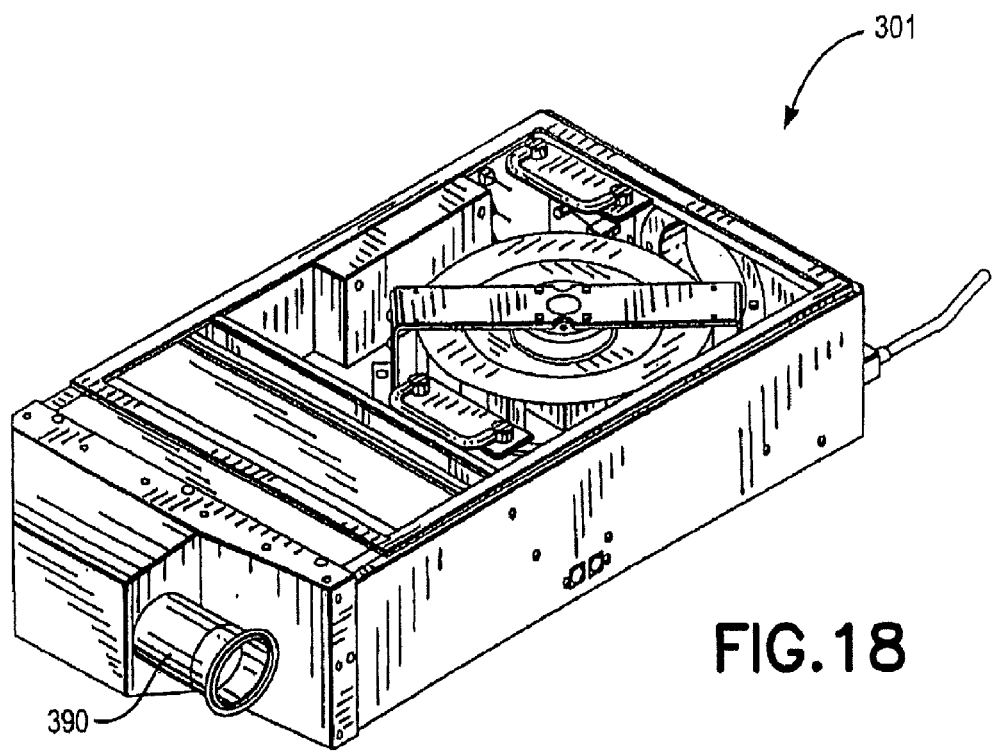
FIG. 18 is a perspective view of an exhaust blower in accordance with an embodiment of the invention.
Figure 19:
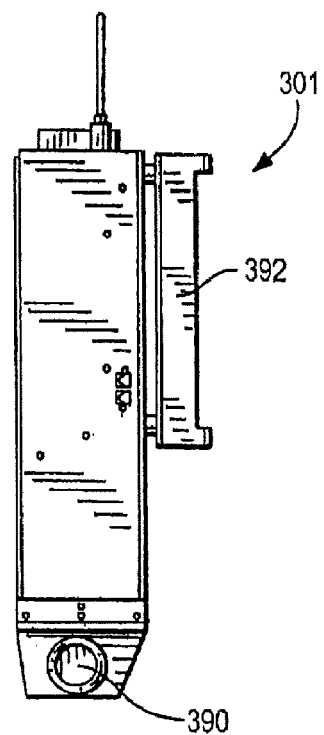
FIG. 19 is a perspective view of an exhaust blower in accordance with an embodiment of the invention.

Whereas air can be supplied to or expelled from the rack and cage system in accordance with an embodiment to the invention in a variety of ways, one such way is to provide air supply blower 201 as shown in FIGS. 16-17 and exhaust blower 301 as shown in FIGS. 18-19. In accordance with the embodiment shown in FIGS. 16-17, air supply blower 201 comprises an air inlet 290 for drawing air in from air circulation manifold 254. Air supply blower 201 HEPA filters the air and expels the HEPA filtered air through an air outlet 291 into air supply manifold 204 to be supplied to shelves 100.

In accordance with the embodiment shown in FIGS. 18-19, exhaust blower 301 comprises an exhaust inlet 390 for drawing air in from exhaust manifold 304. Exhaust blower 301 HEPA filters the air and expels the HEPA filtered air through an exhaust outlet 391 into the atmosphere. Alternatively, exhaust outlet 391 can be connected to a ventilation system for expelling the HEPA filtered air outside the laboratory facility.

Preferably, air supply blower 201 and/or exhaust blower 301 are selectively mountable on and removable from rack 1, which can facilitate cleaning and/or autoclaving of rack 1. As shown in FIGS. 18 and 20, air supply blower 201 and exhaust blower 301 can include mounts 292, 392, respectively. Preferably, the laboratory room or other facility in which rack 1 is kept includes a support, preferably on the wall, for supporting air supply blower 201 and exhaust blower 301 when they are removed from rack 1. The support can be constructed to receive or otherwise engage mounts 292, 392. This can prevent air supply blower 201 and exhaust blower 301 from being misplaced or placed on the floor where it can be damaged.

Additionally, rack 1 can include wheels 12 to facilitate transport of rack 1 to and from the laboratory facilities, such as experiment rooms, cleaning rooms, autoclaving areas, etc.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the position of the various plenums, valves, and apertures as well as the arrangements thereof, can be changed without deviating from the scope of the invention as a matter of application specific to design choice. Additionally, other alterations can be made, as a way of non-limiting example, the number of shelves, compartments on the rack, or the number of cages that can be housed in each compartment, etc. as a matter of application specific to design choice, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A valve assembly comprising:
    a first assembly connected to an exhaust system constructed and arranged to withdraw air through the first assembly, the first assembly having a first displaceable member having a first open position and a first closed position, the first assembly constructed and arranged to mount to the exhaust system, wherein a first pressure is required to move the first displaceable member from the first closed position to the first open position;
    a second assembly having a second displaceable member having a second open position and a second closed position, wherein a second pressure greater than the first pressure is required to move the second displaceable member from the second closed position to the second open position;
    wherein the second assembly is removable from the first assembly, wherein the first displaceable member is in the first closed position and the second displaceable member is in the second closed position when the first assembly and the second assembly are separated;
    wherein the second assembly is constructed and arranged to displace the first displaceable member when the second assembly is connected to the first assembly;
    wherein the second assembly and the first assembly are connected to define an area therebetween;
    wherein the valve assembly has a first connected position wherein the first assembly and the second assembly are connected such that a seal is created between the first and the second assembly wherein the first displaceable member is in the first closed position and the second displaceable member is in the second closed position to prevent leakage of contamination from the valve assembly into the atmosphere;
    the valve assembly having a second connected position wherein the first displaceable member is in the first open position and the second displaceable member is in the second closed position, so that air from within the area between the first assembly and the second assembly is withdrawn through the first assembly;

the valve assembly having a third connected position wherein the first displaceable member is in the first open position and the second displaceable member is in the second open position;

wherein the second assembly is displaced toward the first assembly as the valve assembly transitions from the first connected state to the second connected state, the second assembly being displaced further toward the first assembly as the valve assembly transitions from the second connected state to the third connected state to further prevent leakage of contamination from the valve assembly, wherein the first displaceable member comprises a projection constructed and designed to contact the second displaceable member when the first assembly and the second assembly are connected.

2. The valve assembly of claim 1, further comprising a first spring constructed and arranged to apply a first biasing pressure on the first displaceable member to urge the first displaceable member into the first closed position.

3. The valve assembly of claim 1, further comprising a second spring constructed and arranged to apply a second biasing pressure on the second displaceable member to urge the second displaceable member in the second closed position.

4. The valve assembly of claim 1, wherein the second assembly is mounted on a cage for housing an animal.

5. The valve assembly of claim 1, comprising a filter mounted on the second assembly.

6. The valve assembly of claim 1, wherein the first assembly and second assembly cooperate to prevent spillage of air during connection or disconnection of the first assembly and the second assembly.

7. The valve assembly of claim 1, wherein the first assembly is mounted on a rack constructed and arranged to house a plurality of cages.

8. The valve assembly of claim 7, wherein the first assembly and second assembly cooperate to prevent spillage of air into the rack during connection or disconnection of the first assembly and the second assembly.

* * * * *